Feb. 11, 1930. W. CHIPPERFIELD 1,746,886
POWER OPERATED TOOL OR WORK CLAMP
Filed Jan. 28, 1928 2 Sheets-Sheet 2

Patented Feb. 11, 1930

1,746,886

UNITED STATES PATENT OFFICE

WALTER CHIPPERFIELD, OF HARROW, ENGLAND

POWER-OPERATED TOOL OR WORK CLAMP

Application filed January 28, 1928, Serial No. 250,273, and in Great Britain February 5, 1927.

This invention is for improvements in or relating to power-operating tool or work clamps, and has for one of its objects to provide a construction in which the tool or work, as the case may be, shall be held with great rigidity and in which the control of the clamp by the operator is facilitated. The invention is particularly applicable to pneumatic clamps for the tool-holding turrets of lathes but is not restricted to this use.

According to one feature of the invention there is provided a power-operated tool or work clamp in which the clamping pressure is applied through a wedge. This arrangement has the advantage that not only is it readily possible to transmit heavy pressures, but the wedge will remain automatically in pressure-applying position and it will not be essential to maintain in operation the power which forces the wedge into clamping position, though this can be done if desired. Preferably, the clamp is so arranged that the power may be applied to the wedge to move it both in pressure-applying direction and in the reverse direction. This is desirable because considerable force is necessary in order to unlock a wedge which has been properly forced home.

It is also a feature of the invention to arrange for the power to be applied to separate and maintain separated the tool- or work-holder and its support. This is particularly advantageous where locating devices are provided for determining a plurality of alternative relative settings of the tool- or work-holder and its support, since the power may be employed to separate the tool- or work-holder and its support sufficiently to disengage the locating devices, and may further be employed to maintain such parts so separated while they are relatively adjusted to a fresh setting. The tool- or work-holders, particularly in turret lathes, are of considerable weight and by having this weight supported by the power supplied for the clamp, the manipulation of the tool- or work-holder by the operator is facilitated.

According to a further feature of the invention the clamping pressure is applied through a lever which has the power exerted upon it (for example by the aforesaid wedge) at a position which is at a greater distance from its fulcrum than the position at which the reacting effort is exerted upon it. In other words the lever offers a mechanical advantage to the clamping pressure, the desirability of which is apparent.

Conveniently, the tool- or work-holder takes the form of a shell inside which the aforesaid wedge and one or more of the said levers are housed, and this shell may be provided adjacent to each of the said levers with a co-operating abutment which is removable from operative position. That is to say, in order to permit the levers to enter or leave the housing the corresponding abutments may be withdrawn and returned to operative position after the assembling or dismounting operations are completed.

A tool-holder for a turret lathe constructed in accordance with the present invention will now be described, by way of example only, with the aid of the accompanying drawings, in which—

Like reference numerals indicate like parts throughout the drawings.

Figure 1:
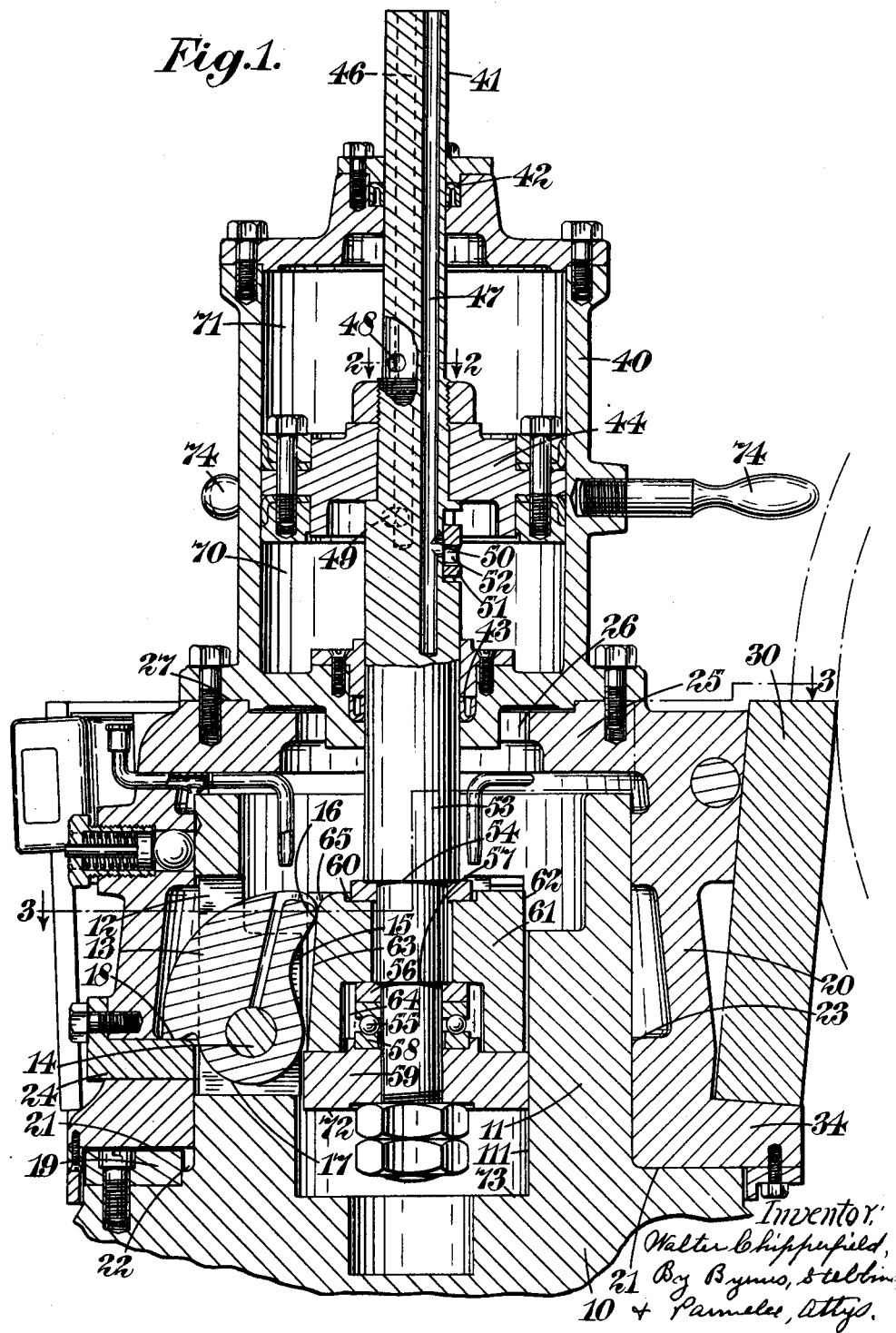
Figure 1 is a section, along the line 1—1 of Figure 3, of the tool-holder looking in the direction of the arrows.
Figure 2:
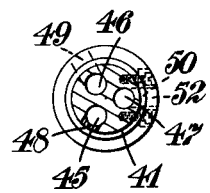
Figure 2 is a section along the line 2—2 of Figure 1, looking in the direction of the arrows.

The support for the tool-holder is indicated at 10 and may be mounted on the bed of the lathe so that it can be traversed in two directions at right angles in the usual manner. The support is formed with an upstanding annulus 11 on the exterior of which the turret is centered. The annulus 11 has three openings 12 formed in it at uniformly spaced positions, to accommodate clamping levers 13. Each of the levers 13 is pivotally mounted on a spindle 14 secured to the annulus 11 and having its axis lying parallel with the base of the annulus 11 and tangential to its median circle, so that the levers 13 swing radially with respect to the annulus. Each lever 13 is formed with an inwardly-directed face 15 extending upwardly from the spindle 14, and has a bearing projection 16 at the upper end of the face 15. Each lever 13 also has a downwardly-directed face 17 extending outwardly of the spindle 14 which has a bearing projection 18 at its outer extremity. The first-named bearing point 16 receives the clamping effort from the power means and the second bearing point 18 is the one by which the reacting effort is applied.

Figure 3:
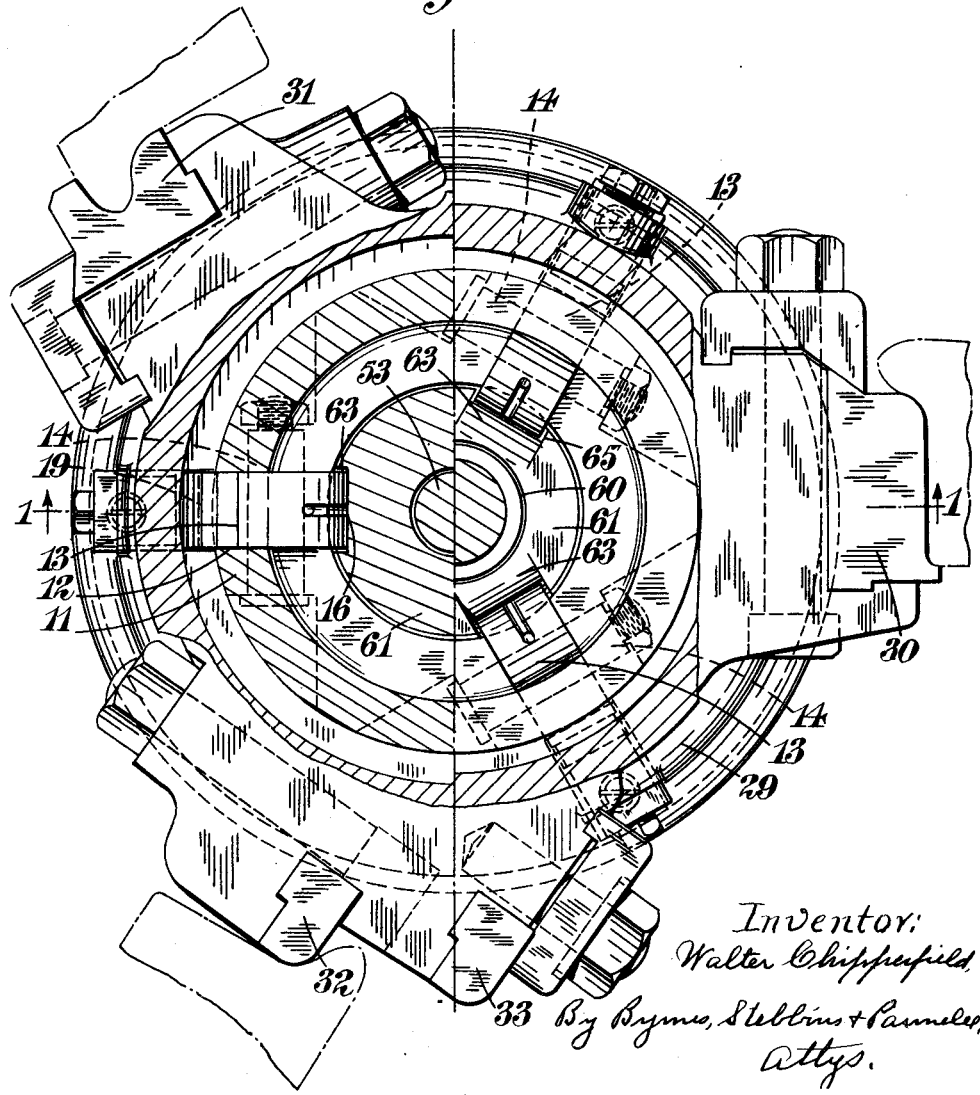
Figure 3 is a section along the line 3—3 of Figure 1, looking in the direction of the arrows.

The tool-holder is in the form of a shell 20 which surrounds the annulus 11 on the outer surface of which it slidably and rotatably bears. Referring to Figure 3, it will be seen that the tool-holder carries four tools spaced around it; these tools are as described in British specification No. 3,307 of 1927, and comprise tool bits 30, 31, 32 and 33 which are clamped to the tool-holder 20 at their upper ends and are supported at their lower ends by outstanding flanges such as 34 in Figure 1. The tool 30 is a tread forming tool, the tool 31 is a flange forming tool and the tools 32 and 33 are roughing tools.

The lower annular surface 21 of the tool-holder is formed with three keyways 22 equally spaced apart around it, and the upper surface of the support 10 has secured to it three locating devices 19 in the form of tapered keys which are equally spaced around the annulus 11 and which co-operate with the keyways 22 to locate the tool-holder in one of three positions corresponding respectively to the tool 30, the tool 31 or one of the tools 32 or 33 being in operative position. It will be seen that in order to rotate the tool-holder 20, when changing the tool used, it is necessary to raise the tool-holder until the lower annular surface 21 is above the level of the top of the locating device 19. Towards the lower end of the tool-holder 20 its inner cylindrical surface is formed with an upwardly facing ledge 23 with which the bearing projections 18 of the levers 13 engage. The portions of this ledge with which the levers engage when the turret is in one of its three operative settings are constituted by slidable abutments 24. In order to permit the tool-holder 20 to be brought into position over the annulus and clamping levers it is necessary for these abutments to be slid outwardly, but when once the parts are in position they can be slid inwardly again into their normal position.

The top 25 of the tool-holder has formed in it an opening 26 and has secured on its upper surface 27 a double-acting pneumatic cylinder 40, which is mounted co-axially with the tool-holder 20. A piston rod 41 extends through stuffing boxes 42 and 43 at each end of the cylinder and has a piston 44 of normal construction secured to it. The upper end of the piston rod 41 is formed with three passages 45, 46 and 47, of which passages 45 and 46 are air admission passages and open through ports 48 and 49 above and below the piston respectively and the passage 47 is an exhaust passage and opens through the port 50 below the piston. Overlying the port 50 is a plate 51 which is adjustably secured to the piston rod and has an opening 52 formed in it. By adjusting the position of the plate 51 so that the hole 52 registers more or less with the port 51, the amount of opening of the latter can be regulated. A valve (not shown) is provided at the top end of the piston rod for the purpose of regulating the admission of compressed air to one side or other of the piston and to allow the air above the piston 44 to exhaust the atmosphere through the passage 45. Any suitable valve may be used for this purpose.

The lower end 53 of the piston rod extends through the opening 26 into the interior of the annulus 11. The lower end 53 of the piston rod 41 is formed with a downwardly-directed shoulder 54, against which abuts the upper end 60 of a member 61. The outer cylindrical surface 62 of the member 61 has formed in it three wedge surfaces 63 which face more or less upwardly at a small angle to the vertical. The wedge surfaces 63 co-operate with the levers 13 so that when the member 61 is raised the levers 13 are forced outwardly and downwardly to apply clamping pressure to the tool-holder 20. A recess 64 is formed in the bottom surface of the member 61 and in this recess is housed a roller bearing 55, the upper race 56 of which abuts against a downwardly-directed shoulder 57 on the lower end 53 of the piston rod, and also serves to prevent relative axial movement between the piston rod and the member 61 while allowing relative rotation between these two parts. The lower race 58 of the ball bearing abuts against a collar 59 which surrounds and is secured to the lower end of the piston by means of two locking nuts. The collar 59 is of such diameter that it bears against the inner cylindrical walls 111 of the annulus 11 and serves as a guide for the end of the piston rod.

It will be seen from Figure 1 that the wedge surfaces 63 lie at the bottom of wedge-shaped recesses 65 into which the bearing projections 16 of the levers 13 extend. The member 61 is thus prevented from rotating relatively to the annulus 11.

When it is desired to clamp the tool-holder, for example, in the position shown in Figure 1, compressed air is admitted through the passage 46 and port 49 to the lower end 70 of the cylinder 40 whence it escapes at a greatly reduced pressure at the port 50 and passage 47. The pressure within the lower end 70 of the cylinder will tend to move the tool-holder 20 down towards its support 10 and the piston 44 upwardly away from the support 10. The pressure will thus raise the piston 44, the piston rod 41 and the wedge member 61 until the wedge surfaces 63 engage the bearing projections 16 of the levers 13. Further movement will cause the levers 13 to move outwardly and the bearing projections 18 thereon to move downwardly against the abutments 24 so as to clamp the tool-holder 20 on to its support 10. It will not be necessary to maintain the air pressure on the lower side of the piston 44, since the wedging action will maintain the member 61 in clamping position.

In order to unclamp the tool-holder so that it can be adjusted to bring a fresh tool into operation, air is admitted to the top end 71 of the cylinder 40 through the passage 45 and the port 48 so as to move the piston 44 downwards relatively to the cylinder. As the piston 44 moves downwards it will move the member 61 downwards out of clamping position so as to release the clamping pressure and to allow the levers 13 to move inwards. Further movement of the piston will bring the lower surface 72 of the collar 59 on the piston rod into contact with a ledge 73 on the annulus 11 so as to arrest the movement of the piston and piston rod towards the support 10. Since the piston cannot move any further downwards, the cylinder 40 will rise carrying with it the tool-holder 20 until the piston reaches the bottom of the cylinder. The dimensions of the parts are such that the cylinder 40 and tool-holder 20 will lift sufficiently to raise the bottom surface 21 of the tool-holder above the level of the top of the keys 19 so that the tool-holder can be rotated to bring a fresh tool into operative position. When the tool-holder has been turned in order to bring the new tool into operative position the air in the upper end of the cylinder is exhausted so as to lower the tool-holder on to its support, to which it is clamped in the manner already described.

It will be noticed that the tool-holder 20, the cylinder 40, the piston 44 and the piston rod 41 are all supported by the ball bearing 56 on the collar 59, which latter is in its turn supported by the support 10; the bearing 56 thus allows of the tool-holder being easily rotated by means of the handles 74 secured to the cylinder 40. Since the wedge member 61 is not secured to the piston rod it will not rotate therewith, but will remain stationary relatively to the annulus 11. The shape of the members 13 is such that, when the piston is towards the bottom of its stroke and the wedge member 61 is in its lowered position, they can move inwards to allow the tool-holder to rise. In order to move the tool-holder from its support, the levers 13 must be moved outwards to clear the member 61. For this purpose the slidable abutments 24 are withdrawn so that the bearing projections 18 of the levers can move below the level of the ledge 23.

I claim:—

1. The combination with a holder, of a support for the holder, clamping means for clamping the holder to the support, a prime-mover comprising a double-acting cylinder secured to that end of the holder remote from its support and in alignment therewith, a piston in said cylinder, and a piston-rod extending into said holder, an operative connection between the clamping means and the piston-rod whereby the prime-mover can move the clamping means at will to clamp the holder to its support, and means actuated by said prime-mover for separating said holder from its support at will and maintaining such parts separated.

2. A power-operated turret, comprising a holder, a support for the holder, locating devices for determining a plurality of alternative relative settings of the holder and the support, clamping means for clamping the holder to the support, a prime-mover comprising a double-acting cylinder secured to that end of the holder remote from its supports and in alignment therewith, a piston in said cylinder, a piston-rod extending into said holder, an operative connection between said clamping means and the piston-rod whereby the prime-mover can move the clamping means at will to clamp the holder to the support, and means actuated by said prime-mover for separating the holder at will from its support sufficiently to disengage the locating devices and for maintaining such parts separated while they are relatively adjusted to a fresh setting.

3. The combination with a holder for the tool or work, of a support for the holder, locking means for holding said holder to its support, a wedge arranged to be engaged with and to actuate said locking means, a prime-mover, and operative connection between the wedge and the prime-mover whereby the latter can move the wedge to engage the locking means and clamp the holder at will to its support, and means actuated by said prime-mover for separating said holder at will from its support and maintaining such parts separated.

4. The combination with a holder for the tool or work, of a support for the holder, locking means for holding said holder to its support, a wedge arranged to be engaged with and to actuate said locking means, a prime-mover, an operative connection between the wedge and the prime-mover whereby the latter can move the wedge at will to engage the locking means and clamp the holder to its support, and can move said wedge at will out of engagement with said locking means, and means actuated by said prime-mover for separating said holder from its support and maintaining such parts separated.

5. The combination with a holder for the tool or work, which holder is in the form of a shell, of a support therefor, a lever mounted on one said part and arranged to engage the other said part to hold them together, a prime-mover, a wedge located within said holder, an operative connection between the wedge and the prime-mover whereby the latter can move the wedge at will to engage and rock the lever and clamp the holder to its support, and means actuated by said prime-mover for separating said holder at will from its support and maintaining such parts separated.

6. The combination with a holder for the tool or work, which holder is in the form of a shell, of a support therefor, a plurality of levers pivotally mounted on said support, co-operating abutments for the levers, which abutments are mounted on said holder and are removable from operative positions thereon, a prime-mover, a wedge located within said holder, an operative connection between the wedge and the prime-mover whereby the latter can move the wedge to engage and rock the levers and clamp the holder at will to its support, and means actuated by said prime-mover for separating said holder at will from its support and maintaining such parts separated.

7. The combination with a holder for the tool or work, which holder is in the form of a shell, of a support therefor, a lever mounted on one said part and arranged to engage the other said part to hold them together, a double-acting pneumatic cylinder which is secured to that end of the holder remote from its support and in alignment therewith a piston in the cylinder, a piston-rod extending into said holder, a wedge located within said holder and operatively connected to said piston-rod to move with it to engage and rock said lever to clamp the holder to its support and means operatively connected to the piston-rod for separating the holder from its support and maintaining such parts separated.

8. The combination with a holder for the tool or work, which holder is in the form of a shell, of a support therefor, a plurality of levers pivotally mounted on said support, co-operating abutments for the levers, which abutments are mounted on said holder and are removable from operative positions thereon, a double-acting pneumatic cylinder which is secured to that end of the holder remote from its support, a piston in said cylinder, a piston-rod extending into said holder, a wedge mounted on said piston-rod to move therewith into engagement with said levers to rock them and clamp the holder at will to its support, and means operatively connected to the piston-rod for separating the holder at will from its support and maintaining such parts separated.

9. A power-operated turret comprising a holder for the tool or work, which holder is in the form of a shell, a support therefor, a lever pivotally mounted on said support, a double-acting pneumatic cylinder which is secured to that end of the holder remote from its support, a piston in said cylinder, a piston-rod extending into said holder, a wedge located within said holder and operatively connected to said piston rod to move with it, means for admitting air to one end of the cylinder to engage the wedge with the lever so as to rock the latter and clamp the holder at will to its support and means for admitting air to the other end of the cylinder to move the piston-rod so as to engage the support and separate the holder at will from the support and maintain such parts separated.

10. A power-operated turret, comprising a holder for the tool or work, a support for the holder, co-operating locating devices provided on and fixed relatively to said parts for determining a plurality of alternative settings of the holder relative to its support, clamping means for clamping the holder to its support, a wedge arranged to be engaged with and to actuate said locking means, a prime-mover operatively connected to the wedge and arranged to move the latter whereby it will actuate the clamping means to clamp the holder at will to its support, and means actuated by said prime-mover for separating said holder at will from its support sufficiently to disengage the locating devices and for maintaining such parts separated.

11. A power-operated turret, comprising a holder for the tool or work, a support for the holder, locating devices for determining a plurality of alternative relative settings of the holder and the support, a lever mounted on said support, a double-acting pneumatic cylinder which is secured to that end of the holder remote from its support, a piston in said cylinder, a piston-rod extending into said holder, a wedge located within said holder and operatively connected to said piston-rod to move with it, means for admitting air to one end of the cylinder to engage the wedge with the lever so as to rock the latter and clamp the holder at will to its support and means for admitting air to the other end of the cylinder, to move the piston-rod so as to engage the support and separate the holder at will from its support sufficiently to disengage the locating devices and maintain such parts separated.

12. The combination with a holder for the tool or work, which holder is in the form of a shell, of a support therefor, a plurality of levers pivotally mounted on said support, co-operating abutments for the levers, which abutments are mounted in said holder and are removable from operative positions thereon, a double-acting pneumatic cylinder which is secured to that end of the holder remote from its support, a piston in said cylinder, a piston-rod extending into said holder, a wedge rotatably mounted on said piston-rod to move therewith into engagement with said levers to rock them and clamp the holder at will to its support, means for admitting air to one end of said cylinder to move said piston-rod so as to engage said wedge with said levers, and means for admitting air to the other end of said cylinder to move the piston-rod so as to engage a part carried thereby with the support and separate the holder at will from the support and maintain these parts separated.

13. A power-operated turret comprising a holder for the tool or work, which holder is in the form of a shell, a support for the holder, a double-acting pneumatic cylinder which is secured to that end of said holder remote from its support and in alignment therewith, a piston in the cylinder, a piston-rod extending into the holder, a plurality of levers located within the holder around the piston-rod and pivotally mounted on the support, a plurality of co-operating abutments so mounted in the holder as to be removable from operative position therein, an annular wedging member surrounding said piston-rod and coupled thereto so as to move therewith and to be rotatable thereabout, a plurality of wedging surfaces formed on said wedging member and one appropriated to each lever, an annular abutment surrounding said piston-rod and coupled thereto so as to move therewith and to be rotatable thereabout, an antifriction bearing forming part of said abutment, means for admitting air to that end of the cylinder adjacent to the holder for moving said wedging member axially and engaging its wedging surfaces with the levers to rock them and clamp the holder at will to its support, and means for admitting air to the other end of the cylinder for moving the abutment into engagement with the support and maintain such parts separated while they are relatively adjusted to a fresh setting.

14. A power-operated turret comprising a holder for the tool or work, which holder is in the form of a shell, a support on which the holder is mounted to be rotatable about a vertical axis, locating devices for determining a plurality of alternative settings of the holder relatively to its support, a vertical double-acting pneumatic cylinder secured to the top of the holder in alignment therewith, a piston in the cylinder, a piston-rod extending downwardly into the holder along the axis about which the latter is rotatable, an annular wedging member surrounding said piston-rod and engaged therewith so as to move with the piston-rod and be rotatable relatively thereto, a plurality of wedging surfaces formed on and spaced round the wedging member, an equal number of levers located within the holder, spaced round the wedging member and each pivotally mounted on the support and arranged to be engaged with one of the wedging surfaces, an annular abutment surrounding the piston-rod below the wedging member and coupled to the piston-rod to move therewith and to be rotatable relatively thereto, an anti-friction bearing interposed between the abutment and the piston-rod, means for admitting air to the lower end of the cylinder for moving the wedging member to engage with the levers and to rock them to clamp the holder at will to the support, and means for admitting air to the upper end of the cylinder for moving the abutment into engagement with the support to separate the holder at will from the support sufficiently to disengage the locating devices and to support the holder on the piston rod and bearing while it is being adjusted to a fresh setting relatively to the support.

In testimony whereof I affix my signature.

WALTER CHIPPERFIELD.